US005448385A

United States Patent [19]

Deffontaines et al.

[11] Patent Number: 5,448,385

[45] Date of Patent: Sep. 5, 1995

[54] ACTIVE MATRIX LIQUID CRYSTAL DISPLAY DEVICE WITH INTERDIGITATED COUNTER ELECTRODES

[75] Inventors: Christophe Deffontaines, Paris; Ambroise Parker, Rueil Malmaison; Philippe Tison, Argenteuil, all of France

[73] Assignee: Societe d'Applications Generales d'Electricite et de Mecanique SAGEM, France

[21] Appl. No.: 199,291

[22] PCT Filed: Jul. 1, 1993

[86] PCT No.: PCT/FR93/00668

§ 371 Date: Mar. 2, 1994

§ 102(e) Date: Mar. 2, 1994

[87] PCT Pub. No.: WO94/01801

PCT Pub. Date: Jan. 20, 1994

[30] Foreign Application Priority Data

Jul. 2, 1992 [FR] France .............................. 92 08159

[51] Int. Cl.[6] .......................................... G02F 1/1343

[52] U.S. Cl. ...................................... 359/59; 359/87; 359/89

[58] Field of Search ...................... 359/87, 54, 59, 89, 359/94; 345/96, 87, 93, 103

[56] References Cited

U.S. PATENT DOCUMENTS 4,973,135 11/1990 Okada et al. ......................... 359/87

FOREIGN PATENT DOCUMENTS 0224388 6/1987 European Pat. Off. ............. 359/59
2590394 5/1987 France ................................ 359/59
2116892 5/1990 Japan ................................. 345/103

OTHER PUBLICATIONS

Lechner et al., Liquid Crystal Matrix Displays, Nov. 1971, pp. 1566–1579, Proceedings of the IEEE, vol. 59, No. 11.

*Primary Examiner*—Anita Pellman Gross
*Assistant Examiner*—James A. Dudek
*Attorney, Agent, or Firm*—Larson and Taylor

[57] ABSTRACT

The device comprises a thin layer (10) of liquid crystals disposed between a plane backing electrode and control electrodes each co-operating with the backing electrode to define a capacitor and a picture element such that each pixel corresponds to a row and to a column, each control electrode being connected to a control element such as a thin-film transistor enabling it either to be raised to the potential of a conductor which is common to all of the pixels in the column to which it belongs, or else to isolate it therefrom and cause it to take up a floating potential. The backing electrode is made up of two fractions ($\mathbf{20_1}$, $\mathbf{20_2}$) provided with means enabling, them to be taken to different potentials that are inverted on each frame or multiple of the frame frequency, and in which successive columns (or successive groups of a few columns each) of control-electrodes co-operate with different ones of the fractions.

3 Claims, 1 Drawing Sheet

ACTIVE MATRIX LIQUID CRYSTAL DISPLAY DEVICE WITH INTERDIGITATED COUNTER ELECTRODES

The present invention relates to a so-called "active matrix" liquid crystal display screen device comprising a thin layer of liquid crystals disposed between a plane backing electrode and control electrodes each co-operating with the backing electrode to define a capacitor and a picture element such that each pixel corresponds to a row and to a column, each control electrode being connected to a control element such as a thin-film transistor enabling it either to be raised to the potential of a conductor which is common to all of the pixels in the column to which it belongs, or else to isolate it therefrom and cause it to take up a floating potential.

Flat display screens of the type described above are already known. In general, the backing electrode constitutes a common potential plane covering the entire screen. Means are often provided for varying the potential of the backing electrode so as to reduce the dynamic range of the voltage required on the column conductors that receive data.

To avoid residual charge accumulating and which would give rise to ghost images, it is necessary for the mean value over time of the voltage applied to the capacitor of each pixel to be zero. This makes it necessary to reverse the polarity of the voltage applied to the capacitor at regular intervals. However, since the voltages at 50 Hz or at 60 Hz in general use are not perfectly symmetrical, it is impossible to avoid flicker which becomes invisible only when polarities are alternated at a high spatial frequency. In general, that means that the spatial frequency used is the spatial frequency at which the pixels are distributed in rows or in columns.

The solution which comes immediately to mind consists in inverting the voltage applied to the backing electrode (of absolute value Vce) both from one frame to the next and also from one row to the next, and inverting the polarity applied to the column conductors correspondingly. This amounts to saying that the voltages applied to the backing electrode and to the column conductors while displaying rows of order p and p+1 for images of order i and of order i+1 are as follows:

| | | | | | |
|---|---|---|---|---|---|
| image "i" | (or frame "i") | | | | |
| row "p" | backing electrode: | Vce+ | Vce+ | Vce+ | Vce+ |
| | column: | V− | V− | V− | V− |
| row | backing electrode: | Vce− | Vce− | Vce− | Vce− |
| "p + 1" | column: | V+ | V+ | V+ | V+ |
| image | (or frame "i+ ") | | | | |
| "i + 1" | | | | | |
| row "p" | backing electrode: | Vce− | Vce− | Vce− | Vce− |
| | column | V+ | V+ | V+ | V+ |
| row | backing electrode | Vce+ | Vce+ | Vce+ | Vce+ |
| "p + 1" | column | V− | V− | V− | V− |

Under such circumstances, the backing electrode conserves an unchanging polarity Vce+ or Vce− throughout the duration of one row. This makes it easier to control. On the other hand, it is difficult to obtain sufficiently fast convergence of the data presented on each of the column conductors since the polarity of a column conductor is inverted on each row, i.e. at a frequency of a few tens of kHz for a 625-line television type image.

It might be thought that the problem could be avoided by inverting column polarity once per frame, thereby improving the accuracy with which each pixel is controlled. The voltage excursion on the column conductor is then smaller from one row to the next. However, it would then be necessary to invert the polarity of the backing electrode for each "column". Since all of the pixels along a row are written simultaneously, that amounts to saying that it would be necessary for Vce+ = Vce−. The advantage of small dynamic range on the columns would then be lost.

The invention seeks to provide a display screen of the type defined above but satisfying practical requirements better than those known in the past. To this end, the invention proposes a device having a screen in which the backing electrode is made up of two fractions provided with means enabling them to be taken to different potentials that are inverted on each frame or multiple of the frame frequency, and in which successive columns (or successive groups of a few columns each) of control-electrodes co-operate with different ones of the fractions. Said potentials may be equal and of opposite polarities.

In practice, the backing electrodes will generally be constituted by interdigitated conductive equipotential planes whose fingers are of a width corresponding to the width of a column of pixels, thereby achieving a maximum value for the spatial frequency of flicker. Nevertheless, it would be possible to provide fractions in which the fingers occupy more than one column each, e.g. two or even three columns, thereby facilitating implementation.

This disposition makes it possible to combine the advantages of the above indicated solutions while eliminating their respective drawbacks. The polarity of the backing electrodes is inverted at frame frequency only, which has a minimum value of 25 Hz. Likewise, column polarity is inverted only at frame frequency.

The invention will be better understood on reading the following description of a particular embodiment given by way of non-limiting example. The description refers to the accompanying drawings, in which.

Figure 1:
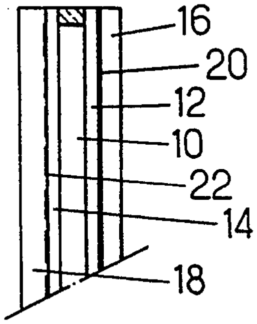
FIG.1. PRIOR ART
FIG. 1 shows a conventional structure for an active matrix liquid crystal display screen.

The display screen shown in FIG. 1 is of the monochrome type. It includes a thin film 10 of liquid crystals placed between two transparent plates 12 and 14 carrying electrodes. For a transmission type screen, the assembly constituted in this way is mounted between a first polarizer 16 and a second polarizer or "analyzer" 18. One of the plates, e.g. 12, carries a backing electrode 20. The other plate, e.g. 14, carries control electrodes 22, each co-operating with the backing electrode 20 to constitute a capacitor and to define a pixel. These electrodes may be implemented in the form of transparent conductive deposits.

Figure 2:
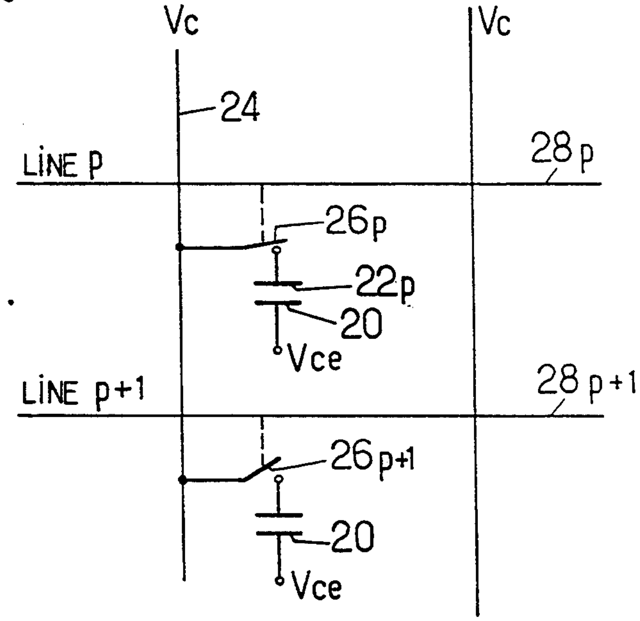
FIG. 2 is a theoretical diagram showing one way of controlling a display device, suitable for use with the active matrix screen of FIG. 1.
Figure 3:
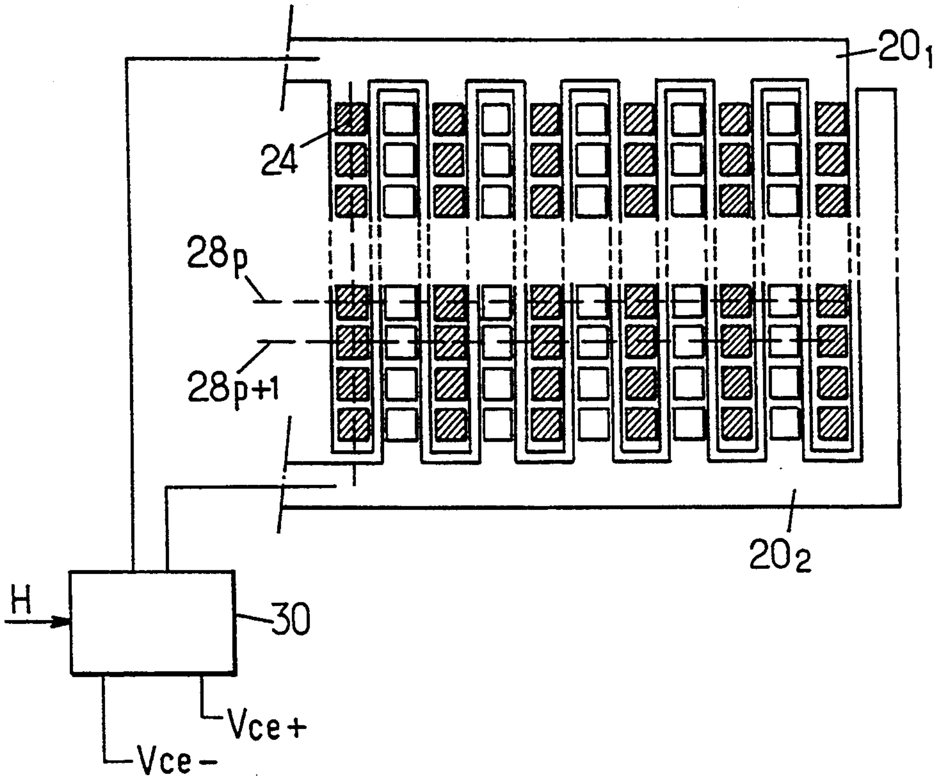
FIG. 3 shows one possible backing electrode structure of the invention suitable for a screen of the kind shown in FIG. 1.

An advantageous control technique is shown diagrammatically in FIG. 2 in which two pixels belonging to a single column can be seen, i.e. they are associated with the same column conductor 24 while belonging to two successive rows i and i+1. Each pixel is controlled by a component, generally constituted by a frame effect transistor, and represented by a respective switch $26_{p,q}$ and $26_{p+1,q}$. All of the transistors in the same row are switched ON simultaneously by bringing the corresponding row conductor 28 to a given potential (e.g. +15 volts) while the row conductors of all the other rows are taken to a transistor-OFF potential (e.g. −5 volts). In FIG. 2, transistor $\mathbf{26}_{p,q}$ is shown as being ON, while the transistors in the other rows are OFF. Transistors that are ON allow the voltage Vc from the corresponding column conductor to pass to the associated control electrode. This information is subsequently conserved throughout the entire duration of the frame.

According to the invention, the backing electrode 20 is split into two fractions $\mathbf{20}_1$, e.g. associated with all even-numbered columns 24, and $\mathbf{20}_2$ which is then associated with all odd-numbered columns. The polarity of each fraction alternates between the values Vce+ and Vce−, such that the two fractions are always of opposite polarities. This result can be obtained by using a sequencer 30 controlled by a clock signal H at the frame frequency.

The switching element may be controlled in the same way as for a conventional device of the kind shown in FIG. 2. However, the control voltages to which the column conductors such as the conductor 24 are taken in order to deliver video information, will depend, for a given result, on which column is concerned.

The succession of polarities applied for rows of order p and p+1 and images of order i and i+1 is summarized in the following table:

| | | col. q | col. q+1 | col. q+2 | col. q+3 |
|---|---|---|---|---|---|
| image "i": | | | | | |
| row "p" | backing electrode 201: | Vce+ | | Vce+ | |
| | backing electrode 202: | | Vce− | | Vce− |
| | column conductor: | V− | V+ | V− | V+ |
| row "p + 1" | backing electrode 201: | Vce+ | | Vce+ | |
| | backing electrode 202: | | Vce− | | Vce− |
| | column conductor: | V− | V+ | V− | V+ |

-continued

| | | col. q | col. q+1 | col. q+2 | col. q+3 |
|---|---|---|---|---|---|
| image "i + 1": | | | | | |
| row "p" | backing electrode 201: | Vce− | | Vce− | |
| | backing electrode 202: | | Vce+ | | Vce+ |
| | column conductor: | V+ | V− | V+ | V− |
| row "p + 1" | backing electrode 201: | Vce− | | Vce− | |
| | backing electrode 202: | | Vce+ | | Vce+ |
| | column conductor: | V+ | V− | V+ | V− |

It can be seen that the polarities on the backing electrode fractions and on the column conductors are inverted at the frame frequency only.

We claim:

1. A display device having an "active matrix" liquid crystal screen comprising a thin layer (10) of liquid crystals disposed between a plane backing electrode and control electrodes each co-operating with the backing electrode to define a capacitor and a picture element such that each pixel corresponds to a row and to a column, each control electrode being connected to a control element such as a thin-film transistor enabling it either to be raised to the potential of a conductor which is common to all of the pixels in the column to which it belongs, or else to isolate it therefrom and cause it to take up a floating potential, characterized in that the backing electrode is made up of two fractions ($\mathbf{20}_1$, $\mathbf{20}_2$) provided with means enabling, them to be taken to different potentials that are inverted on each frame or multiple of the frame frequency, and in which successive columns (or successive groups of a few columns each) of control electrodes co-operate with different ones of the fractions.

2. A device according to claim 1, characterized in that the fractions are constituted by equipotential planes of interdigitated conductors, with fingers of a width corresponding to the width of a column of pixels.

3. A device according to claim 1, characterized in that the various potentials are equal and of opposite polarities.

* * * * *